United States Patent
Fan et al.

(10) Patent No.: US 11,602,243 B2
(45) Date of Patent: *Mar. 14, 2023

(54) FOOD PROCESSOR

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Qian Fan, Foshan (CN); Xianghe Zeng, Foshan (CN); Jianfei Xu, Foshan (CN)

(73) Assignees: GUANGDONG MIDEA CONSUMER ELECTRICS MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 473 days.

This patent is subject to a terminal disclaimer.

(21) Appl. No.: 16/259,966

(22) Filed: Jan. 28, 2019

(65) Prior Publication Data
US 2019/0150669 A1     May 23, 2019

Related U.S. Application Data

(63) Continuation of application No. PCT/CN2016/107802, filed on Nov. 29, 2016.

(30) Foreign Application Priority Data

Oct. 28, 2016 (CN) .......................... 201610963076.3
Oct. 28, 2016 (CN) .......................... 201610973069.1
(Continued)

(51) Int. Cl.
*A47J 43/046*     (2006.01)
*A47J 43/08*     (2006.01)
*A47J 43/07*     (2006.01)

(52) U.S. Cl.
CPC ............. *A47J 43/046* (2013.01); *A47J 43/07* (2013.01); *A47J 43/0722* (2013.01); *A47J 43/085* (2013.01)

(58) Field of Classification Search
CPC ....................................... A47J 43/046
(Continued)

(56) References Cited

U.S. PATENT DOCUMENTS

| | | | | |
|---|---|---|---|---|
| 1,823,314 A | * | 9/1931 | Brewer | A47J 43/046 366/205 |
| 2,086,858 A | * | 7/1937 | Dunkelberger | B01F 7/0035 366/314 |

(Continued)

FOREIGN PATENT DOCUMENTS

| CN | 102670092 A | 9/2012 |
|---|---|---|
| CN | 103251331 A | 8/2013 |

(Continued)

OTHER PUBLICATIONS

Guangdong Midea Consumer Electrics Manufacturing Co. Ltd., International Search Report, PCT/CN2016/107802, dated Aug. 2, 2017, 4 pgs.
(Continued)

*Primary Examiner* — David L Sorkin
(74) *Attorney, Agent, or Firm* — Morgan, Lewis & Bockius LLP

(57) ABSTRACT

The present disclosure provides a food processor, comprising: a cutter head, wherein a cutter is arranged on the cutter head, the intersecting line of the side wall of the cutter head and the cross section of the cutter head is a cutter head contour line, the maximum inscribed circle or the minimum circumscribed circle of the cutter head contour line is a cutter head base circle, and the central axis of the cutter head penetrates the center of the cutter head base circle; and a cup
(Continued)

A-A body arranged on the cutter head, wherein the intersecting line of the cup wall of the cup body and the cross section of the cup wall is a cup body contour line, the maximum inscribed circle or the minimum circumscribed circle of the cup body contour line is a cup body base circle.

7 Claims, 9 Drawing Sheets

(30) Foreign Application Priority Data

Oct. 28, 2016 (CN) .......................... 201621189881.7
Oct. 28, 2016 (CN) .......................... 201621197386.0

(58) Field of Classification Search
USPC ................................................. 366/205, 314
See application file for complete search history.

(56) References Cited

U.S. PATENT DOCUMENTS

| | | | | |
|---|---|---|---|---|
| 2,282,866 | A * | 5/1942 | Hagen ................... | A47J 43/046 |
| | | | | 366/205 |
| 2,794,627 | A * | 6/1957 | Rodwick ............... | A47J 43/046 |
| | | | | 241/282.2 |
| 3,542,238 | A * | 11/1970 | Uhl ....................... | A47J 43/046 |
| | | | | 220/324 |
| 3,786,999 | A * | 1/1974 | Cabell ................... | A47J 43/046 |
| | | | | 241/282.1 |
| 4,664,530 | A | 5/1987 | Kurome et al. | |
| 6,092,922 | A | 7/2000 | Kett et al. | |
| 6,397,736 | B1 | 6/2002 | Tseng et al. | |
| 7,267,478 | B2 | 9/2007 | Miller et al. | |
| 10,786,117 | B2 * | 9/2020 | Fan ....................... | A47J 43/085 |
| 10,786,118 | B2 * | 9/2020 | Zeng ................... | A47J 43/0761 |
| 2006/0086261 | A1 | 4/2006 | Cohen et al. | |
| 2006/0176768 | A1 | 8/2006 | Williams et al. | |
| 2006/0193200 | A1 * | 8/2006 | Herbert ................ | A47J 43/0727 |
| | | | | 366/314 |
| 2009/0114616 | A1 | 5/2009 | White et al. | |
| 2012/0027902 | A1 * | 2/2012 | Audette .............. | A47J 43/0766 |
| | | | | 426/518 |
| 2013/0264405 | A1 * | 10/2013 | Audette .............. | A47J 43/0722 |
| | | | | 241/277 |
| 2015/0282673 | A1 | 10/2015 | Palmer et al. | |
| 2017/0273511 | A1 | 9/2017 | Harvey | |
| 2019/0150669 | A1 | 5/2019 | Fan et al. | |

FOREIGN PATENT DOCUMENTS

| | | |
|---|---|---|
| CN | 203987646 U | 12/2014 |
| CN | 104257295 A | 1/2015 |
| CN | 104334065 A | 2/2015 |
| CN | 104812280 A | 7/2015 |
| CN | 204839230 U | 12/2015 |
| CN | 204889746 U | 12/2015 |
| EP | 2486833 A1 | 8/2012 |
| EP | 3476263 A4 | 6/2019 |
| JP | H05253084 A | 10/1993 |
| JP | 2002102080 A | 4/2002 |
| JP | 2014239916 A | 12/2014 |
| WO | WO2009/106710 A2 | 9/2009 |
| WO | WO2014/083306 A1 | 6/2014 |
| WO | WO 2018076436 A1 | 5/2018 |

OTHER PUBLICATIONS

Guangdong Midea Consumer Electrics Manufacturing Co. Ltd., Examiner's Requisition, CA3036002, dated Feb.19, 2020, 6 pgs.
Guangdong Midea Consumer Electrics Manufacturing Co. Ltd., Communication Pursuant to Article 94(3), EP16920318.9, dated Oct. 13, 2020, 4 pgs.
Guangdong Midea Consumer Electrics Manufacturing Co. Ltd., Extended European Search Report, EP16920318.9, dated May 13, 2019, 7 pgs.
Midea Group Co., Ltd., CA Office Action, Canadian Patent Application No. 3,036,002, dated Sep. 28, 2020, 3 pgs.
Midea Group Co., Ltd., WO, PCT/CN2016/107802, Aug. 2, 2017, 4 pgs.
Midea Group Co., Ltd., IPRP, PCT/CN2016/107802, dated Apr. 30, 2019, 5 pgs.

* cited by examiner

FOOD PROCESSOR

CROSS-REFERENCE TO RELATED APPLICATIONS

This application is a continuation application of PCT/CN2016/107802, entitled "FOOD PROCESSOR" filed on Nov. 29, 2016, which claims priority to: (i) Chinese Patent Application No. 201610973069.1, entitled "FOOD PROCESSOR" filed with the State Intellectual Property Office of P. R. China on Oct. 28, 2016, (ii) Chinese Patent Application No. 201621197386.0, entitled "FOOD PROCESSOR" filed with the State Intellectual Property Office of P. R. China on Oct. 28, 2016, (iii) Chinese Patent Application No. 201610963076.3, entitled "FOOD PROCESSOR" filed with the State Intellectual Property Office of P. R. China on Oct. 28, 2016, and (iv) Chinese Patent Application No. 201621189881.7, entitled "FOOD PROCESSOR" filed with the State Intellectual Property Office of P. R. China on Oct. 28, 2016, the entire contents of which is incorporated herein by reference.

This application is related to U.S. patent application Ser. No. 16/259,971, entitled "FOOD PROCESSOR" filed on Jan. 28, 2019.

TECHNICAL FIELD

The present disclosure relates to the field of electric apparatuses, and specifically relates to a food processor.

BACKGROUND

The existing stirring system is often relatively regular, the central axis of a cutter head, the central axis of a cutter and the central axis of a cup body are coincident, and the contours of the cutter head and the cup body are regular in shape, so the turbulent effect and the stirring performance are poor.

SUMMARY

In order to solve at least one of the above technical problems, an embodiment in one aspect of the present disclosure provides a food processor.

An embodiment in another aspect of the present disclosure further provides a food processor.

In view of this, according to the embodiment in one aspect of the present disclosure, the present disclosure provides a food processor, comprising: a cutter head, on which a cutter is arranged, wherein the intersecting line of the side wall of the cutter head and the cross section of the cutter head is a cutter head contour line, the maximum inscribed circle or the minimum circumscribed circle of the cutter head contour line is a cutter head base circle, and the central axis of the cutter head penetrates the center of the cutter head base circle; and a cup body located above the cutter head and arranged on the cutter head, wherein the intersecting line of the cup wall of the cup body and the cross section of the cup wall is a cup body contour line, the maximum inscribed circle or the minimum circumscribed circle of the cup body contour line is a cup body base circle, and the central axis of the cup body penetrates the center of the cup body base circle; wherein the distances between different points on the same cup body contour line and the center of the cup body base circle are equal; and the distances between different points on the same cutter head contour line and the center of the cutter head base circle are unequal.

The food processor provided by the present disclosure has a cup body with a non-eccentric structure and the cutter head contour with an eccentric structure. By using the food processor with such an eccentric structure for stirring food, the turbulent effect of stirring can be improved, the cutter is beneficial to crushing food, and then the stirring performance is improved, so that the taste of the food is excellent and the user experience is improved. Further, in order to stir and crush food more sufficiently, the relative positions of the central axis of the cup body, the axis of the cutter head and the axis of the cutter can be adjusted to further improve the turbulent effect of stirring and improve the taste of the food. Further, the cup body of the food processor is provided with an upper opening and a lower opening, and the cross section of the cup body is reduced from top to bottom, i.e., the whole cup body has a certain taper, and the cross section area of the upper end is greater than that of the lower end, so that on the one hand, the cutter is beneficial to crushing food, and on the other hand, the cup body having a certain taper is beneficial to turbulence, the turbulent effect and crushing effect of food are further improved, and the taste of the food is promoted.

In addition, the food processor provided by the present disclosure in the above embodiment may further have the following additional technical features:

In the above technical solution, preferably, the central axis of the cutter head is coincident with that of the cup body.

In this technical solution, the central axes of the cutter head and the cup body are coincident, the cup body contour is not eccentric, but the cutter head contour is eccentric, so that the food processor using a cutter head contour eccentric technology for stirring food can improve the whirl effect of stirring, the flowing speed of food is different, the cutter is beneficial to crushing food, then the stirring performance is improved, the taste of the food is excellent, and the user experience is improved.

In the above technical solution, preferably, the central axis of the cutter head and the axis of the cutter are coincident with the central axis of the cup body.

In this technical solution, the central axis of the cutter head and the axis of the cutter are coincident with the central axis of the cup body, i.e., the cup body, the cutter head and the cutter are on the same central axis, the cup body contour is not eccentric, but the cutter head contour is eccentric, so that the food processor using such an eccentric structure for stirring food can improve the whirl effect of stirring, the cutter is beneficial to crushing food, then the stirring performance is improved, the taste of the food is excellent, and the user experience is improved. Meanwhile, the cup body, the cutter head and the cutter are on the same central axis, thereby facilitating the assembly of each component and improving the production efficiency.

In the above technical solution, preferably, the central axis of the cutter head is coincident with that of the cup body, and has an eccentric distance L1 from the axis of the cutter.

In this technical solution, the central axis of the cutter head is coincident with that of the cup body, and has an eccentric distance L1 from the axis of the cutter, i.e., the cutter is eccentric. By using the structure that the cutter head contour is eccentric and the cutter is eccentric, the whirl effect of stirring is improved, the cutter is beneficial to crushing food, and then the stirring performance is improved, so that the taste of the food is excellent and the user experience is improved.

In the above technical solution, preferably, the central axis of the cutter head is not coincident with that of the cup body.

In this technical solution, the central axis of the cutter head is not coincident with that of the cup body, i.e., the axes are relatively eccentric, meanwhile, the cup body contour is not eccentric, but the cutter head contour is eccentric, so that the food processor using this eccentric technology for stirring food can improve the whirl effect of stirring, the cutter is beneficial to crushing food, then the stirring performance is improved, the taste of the food is excellent and the user experience is improved.

In the above technical solution, preferably, the central axis of the cutter head is coincident with the axis of the cutter, and has an eccentric distance L2 from the central axis of the cup body.

In this technical solution, the central axis of the cutter head is coincident with the axis of the cutter, and has an eccentric distance L2 from the central axis of the cup body, i.e., the cutter head is coaxial with the cutter, the axis of the cup body has an eccentric distance L2 from the axes of the cutter head and the cutter, meanwhile, the cutter head contour is eccentric, but the cup body contour is not eccentric. Through the cup body using such an eccentric technology for stirring food, the whirl effect of stirring can be improved, the cutter is beneficial to crushing food, and then the stirring performance is improved, so that the taste of the food is excellent and the user experience is improved.

In the above technical solution, preferably, the central axis of the cup body is coincident with the axis of the cutter, and has an eccentric distance L3 from the central axis of the cutter head.

In this technical solution, the central axis of the cup body is coincident with the axis of the cutter, and has an eccentric distance L3 from the central axis of the cutter head, i.e., the cup body is coaxial with the cutter and has an eccentric distance L3 from the cutter head, meanwhile, the cutter head contour is also eccentric, but the cup body contour is not eccentric. By using this eccentric structure, the whirl effect of stirring is improved, the cutter is beneficial to crushing food, and then the stirring performance is improved, so that the taste of the food is excellent and the user experience is improved.

In the above technical solution, preferably, the central axis of the cup body has an eccentric distance L4 from the central axis of the cutter head; the central axis of the cutter head has an eccentric distance L5 from the axis of the cutter; and the central axis of the cup body has an eccentric distance L6 from the axis of the cutter.

In this technical solution, the central axis of the cup body, the central axis of the cutter head and the axis of the cutter all have eccentric distances, meanwhile, the cutter head contour is eccentric, but the cup body contour is not eccentric. By using such an eccentric structure, the turbulent speed of food and the distance between the cup body and the cutter are changed, so that the whirl effect of stirring is further improved, the cutter is beneficial to crushing food, then the stirring performance is improved, the taste of the food is excellent, and the user experience is improved. When the central axis of the cup body, the central axis of the cutter and the central axis of the cutter head are nonlinear or not parallel, the distance between each central axis refers to the distance between each central axis and the intersecting point of any same cross section.

In the above technical solution, preferably, further comprising a contour eccentric distance, which is an absolute value obtained by subtracting the radius of the base circle from the distances between different points on the contour line and the center of the base circle, wherein the contour eccentric distance of the cutter head L7 is an absolute value obtained by subtracting the radius of the cutter head base circle from the distances between different points on the cutter head contour line and the center of the cutter head base circle.

In this technical solution, the contour eccentric distance of the cutter head is L7, and the cup body contour is not eccentric. Through the eccentric structure, the turbulent effect is improved, and then the stirring performance is promoted.

In the above technical solution, preferably, the eccentric distance L1 is more than or equal to 0 mm and less than or equal to 50 mm.

In the above technical solution, preferably, the eccentric distance L2 is more than or equal to 0 mm and less than or equal to 50 mm.

In the above technical solution, preferably, the eccentric distance L3 is more than or equal to 0 mm and less than or equal to 50 mm.

In the above technical solution, preferably, the eccentric distance L4, the eccentric distance L5 and the eccentric distance L6 are respectively more than or equal to 0 mm and less than or equal to 50 mm.

In the above technical solution, preferably, the contour eccentric distance of the cutter head L7 is more than or equal to 0 mm and less than or equal to 100 mm.

In this technical solution, by setting reasonable eccentric distances, the optimal turbulent effect is realized, and the stirring performance is improved.

In the above technical solution, preferably, the cutter head and the cup body are of an integrated structure or a split structure.

In this technical solution, on the one hand, the cutter head and the cup body are of an integrated structure, so that the stability is good, the installation is facilitated, and the production efficiency is improved; and on the other hand, the cutter head and the cup body are of a split structure to facilitate disassembly and maintenance, and in order to ensure the leak tightness of the cutter head and the cup body, preferably, a sealing ring is arranged between the cutter head and the cup body.

In the above technical solution, preferably, the cross section of the cutter head is dome-shaped.

In this technical solution, the cross section of the cutter head is dome-shaped, and the eccentricity is formed via irregular curves, so that the turbulent effect of the cup body is improved, the cutter is beneficial to crushing food, and then the stirring performance is improved. Further, the dome shape is an ellipse, the cross section of the cutter head is an ellipse, the cup body with such a structure is easy to be processed, meanwhile, the central axis of the cutter head, the central axis of the cutter and the central axis of the cup body are respectively distributed at two axes of the ellipse to form eccentricity, so that the structure is simple, the operation is easy, the turbulent effect of the cup body is further improved, the cutter is beneficial to crushing food, and then the stirring performance is improved.

In the above technical solution, preferably, the cup wall comprises an outer wall and an inner wall of the cup body; and the contour line of the cup body is an intersecting line of the outer wall of the cup body and the cross section of the outer wall of the cup body, or the contour line of the cup body is an intersecting line of the inner wall of the cup body and the cross section of the inner wall of the cup body.

In this technical solution, the contour line of the cup body may be an intersecting line of the outer wall of the cup body and the cross section of the cup wall, or an intersecting line of the inner wall of the cup body and the cross section of the cup wall. The contour line may be obtained by multiple ways, and the distances between different points on the same contour line and the center of the base circle of the cutter head are unequal, so that an eccentric structure is formed, then the whirl effect is improved, and the stirring performance is promoted.

In any above technical solution, preferably, the cutter comprises at least two groups of blades, each of which comprises at least two blades, wherein the leaf blades of one group of blades extend downward obliquely, and the leaf blades of the other group of blades extend upward obliquely; or the leaf blades of one group of blades extend horizontally, and the leaf blades of the other group of blades extend upward or downward obliquely.

In this technical solution, multiple groups of blades are provided, and the extending angle of each group of blades is different, so that the turbulent effect of the cup body is further improved, the contact area of the cutter and food is increased to realize multiple times of crushing on food, the food is crushed more thoroughly, the taste of the food is promoted, and the satisfaction of a user is improved.

In the above technical solution, preferably, the cutter comprises two groups of blades, which are respectively a first group of blades and a second group of blades, each of which is composed of two leaf blades; the leaf blade of the first group of blades comprises an oblique part and a horizontal part, the oblique part is close to the central axis of the cutter head, and the horizontal part is away from the central axis of the cutter head; wherein the leaf blades of the first group of blades extend downward obliquely and are arranged below the second group of blades, and the lead blades of the second group of blades extend upward obliquely.

In this technical solution, two groups of blades are provided, wherein the first group of blades is arranged above the second group of blades, the leaf blades of the first group of blades extend downward, while the blades of the second group of blades extend upward, i.e., the extending directions are opposite; through the groups of blades setting upper and lower, the contact area of the cutter and food is increased sufficiently, and the crushing efficiency is improved; and the extending directions of the blades are opposite, so that the turbulent effect and the crushing effect on different heights are further improved, the overall food crushing efficiency is improved, the crushing effect is also improved, and then the taste of the food and the user experience are promoted.

In the above technical solution, preferably, the first group of blades and the second group of blades are of an integrated structure.

In this technical solution, the two groups of blades are of an integrated structure, so that the overall strength of the cutter is improved, the service reliability of the cutter is guaranteed, and the service life of the cutter is prolonged; and the integrated cutter facilitates maintenance and installation, and improves the production efficiency.

In any above technical solution, preferably, turbulent ribs are arranged in the cup body, a cup lid is arranged on the cup body, the cup lid is provided with a feed port, and a feed cover is arranged on the feed port.

In this technical solution, turbulent ribs are arranged in the cup body, thus further improving the turbulent effect and the crushing effect; a cup lid is arranged on the cup body, thus preventing splashing in the cup body in the food crushing process which may make the surrounding environment messy; the cup lid is further provided with a feed port, thus facilitating feeding, avoiding frequently opening the cup lid and reducing the operation steps; and in order to prevent foreign matters from entering the cup body, a feed cover is arranged at the feed port, and the feed port is closed by the feed cover after feeding, thus ensuring the usage clean and hygienic.

In the above technical solution, preferably, a cup base on which the cup body is arranged is further included, wherein the cup body is connected to the cup base via threads or clamping.

In this technical solution, the cup body is arranged on the cup base, and the cup body is connected to the cup base via threads or clamping, so that the structure is simple, assembly and disassembly are facilitated, the production efficiency is improved, and the production cost is reduced.

In the above technical solution, preferably, a sealing ring is arranged between the cutter head and the cup body, and the cup body is connected to the cup base via threads to press and fix the cutter head at the bottom of the cup body.

In this technical solution, a sealing ring is arranged between the cutter head and the cup body, thus ensuring the sealing effect between the cup body and the cutter head; and furthermore, the cup body is connected to the cup base via threads to press the cutter head at the bottom of the cup body, thus facilitating fixation of the cutter head and ensuring the using safety.

According to the embodiment in another aspect of the present disclosure, provided is a food processor, comprising: a cutter head, on which a cutter is arranged, wherein the intersecting line of the side wall of the cutter head and the cross section of the cutter head is a cutter head contour line, the maximum inscribed circle or the minimum circumscribed circle of the cutter head contour line is a cutter head base circle, and the central axis of the cutter head penetrates the center of the cutter head base circle; and a cup body located above the cutter head and arranged on the cutter head, wherein the intersecting line of the cup wall of the cup body and the cross section of the cup wall is a cup body contour line, the maximum inscribed circle or the minimum circumscribed circle of the cup body contour line is a cup body base circle, and the central axis of the cup body penetrates the center of the cup body base circle; wherein the central axis of the cutter head is coincident or not coincident with that of the cup body.

In the food processor provided by the present disclosure, on the one hand, the central axis of the cutter head is coincident with that of the cup body, i.e., the central axes of the cutter head and the cup body are coincident, and may be coincident with the axis of the cutter or have an eccentric distance; and on the other hand, the central axis of the cutter head is not coincident with that of the cup body, i.e., the cutter head is coaxial with the cutter and has an eccentric distance away from the cup body, the cup body is coaxial with the cutter and has an eccentric distance away from the cutter head, or every two of the central axis of the cutter head, the central axis of the cup body and the axis of the cutter have an eccentric distance. The food processor for stirring food by using an eccentric technology has the advantages that the whirl effect of stirring can be improved, the cutter is beneficial to crushing food, then the stirring performance is improved, the taste of the food is excellent and the user experience is improved.

In addition, the food processor provided by the present disclosure in the above embodiment may further have the following additional technical features:

In the above technical solution, preferably, the central axis of the cutter head is coincident with that of the cup body, and has an eccentric distance L1 from the axis of the cutter.

In this technical solution, the central axis of the cutter head is coincident with that of the cup body, and has an eccentric distance L1 away from the axis of the cutter, i.e., the cutter is eccentric. By using the structure that the cutter is relatively eccentric, the whirl effect of stirring is improved, the cutter is beneficial to crushing food, and then the stirring performance is improved, so that the taste of the food is excellent and the user experience is improved.

In the above technical solution, preferably, the central axis of the cutter head and the axis of the cutter are coincident, and have an eccentric distance L2 away from the central axis of the cup body.

In this technical solution, the central axis of the cutter head and the axis of the cutter are coincident, and have an eccentric distance L2 away from the central axis of the cup body, i.e., the cutter head is coaxial with the cutter, and the axis of the cup body has an eccentric distance L2 away from the axes of the cutter head and the cutter. By using the cup body with such an eccentric structure for stirring food, the whirl effect of stirring can be improved, the cutter is beneficial to crushing food, and then the stirring performance is improved, so that the taste of the food is excellent and the user experience is improved.

In the above technical solution, preferably, the central axis of the cup body is coincident with the axis of the cutter, and has an eccentric distance L3 away from the central axis of the cutter head.

In this technical solution, the central axis of the cup body is coincident with the axis of the cutter, and has an eccentric distance L3 away from the central axis of the cutter head, i.e., the cup body is coaxial with the cutter and has an eccentric distance L3 away from the cutter head. By using such an eccentric structure, the whirl effect of stirring is improved, the cutter is beneficial to crushing food, and then the stirring performance is improved, so that the taste of the food is excellent and the user experience is improved.

In the above technical solution, preferably, the central axis of the cup body and the central axis of the cutter head have an eccentric distance L4; the central axis of the cutter head and the axis of the cutter have an eccentric distance L5; and the central axis of the cup body and the axis of the cutter have an eccentric distance L6.

In this technical solution, the central axis of the cup body, the central axis of the cutter head and the axis of the cutter all have eccentric distances. By using such an eccentric structure, the whirl effect of stirring is further improved, the cutter is beneficial to crushing food, and then the stirring performance is improved, so that the taste of the food is excellent and the user experience is improved. When the central axis of the cup body, the central axis of the cutter and the central axis of the cutter head are nonlinear or not parallel, the distance of each central axis refers to the distance between each central axis and the intersecting point of any same cross section.

In the above technical solution, preferably, the eccentric distance L1, the eccentric distance L2, the eccentric distance L3, the eccentric distance L4, the eccentric distance L5 and the eccentric distance 6 are respectively more than or equal to 0 mm and less than or equal to 50 mm.

In this technical solution, by setting reasonable eccentric distances, the optimal turbulent effect is realized, and the stirring performance is improved.

In the above technical solution, preferably, the distances between different points on the same cup body contour line and the center of the cup body base circle are equal; and the distances between different points on the same cutter head contour line and the center of the cutter head base circle are equal.

In this technical solution, the distances between different points on the same cup body contour line and the center of the cup body base circle are equal, i.e., the cup body contour line is not eccentric, and the distances between different points on the same cutter head contour line and the center of the cutter head base circle are equal, i.e., the cutter head contour line is not eccentric. Meanwhile, on the basis that both the cup body contour and the cutter head contour are not eccentric, on the one hand, the central axis of the cutter head is coincident with that of the cup body; and on the other hand, the central axis of the cutter head is not coincident with that of the cup body, i.e., the central axis of the cutter head and the central axis of the cup body are relatively eccentric. Through the food processor using the eccentric technology for stirring food, the whirl effect of stirring can be improved, the cutter is beneficial to crushing food, and then the stirring performance is improved, so that the taste of the food is excellent and the user experience is improved.

In the above technical solution, preferably, a contour eccentric distance is further included, which is an absolute value of subtracting the radius of the base circle from the distance between different points on the contour line and the center of the base circle, wherein the contour eccentric distance of the cutter head is L7.

In this technical solution, the contour eccentric distance of the cutter head is L7, and the cup body contour is not eccentric. Through the eccentric structure, the turbulent effect is improved, and then the stirring performance is promoted.

In the above technical solution, preferably, the contour eccentric distance of the cutter head L7 is more than or equal to 0 mm and less than or equal to 100 mm.

In this technical solution, by reasonably setting the value of the contour eccentric distance of the cutter head, the optimal turbulent effect can be realized, and then the crushing effect is improved.

In the above technical solution, preferably, the cross section of the cutter head is dome-shaped.

In this technical solution, the cross section of the cutter head is dome-shaped, and the eccentricity is formed via irregular curves, so that the turbulent effect of the cup body is improved, the cutter is beneficial to crushing food, and then the stirring performance is improved. Further, the dome shape is an ellipse, the cross section of the cutter head is an ellipse, the cup body with such a structure is easy to be processed, meanwhile, the central axis of the cutter head, the central axis of the cutter and the central axis of the cup body are respectively distributed at two axes of the ellipse to form eccentricity, so that the structure is simple, the operation is easy, the turbulent effect of the cup body is further improved, the cutter is beneficial to crushing food, and then the stirring performance is improved.

In the above technical solution, preferably, the cutter head and the cup body are of an integrated structure or a split structure.

In this technical solution, on the one hand, the cutter head and the cup body are of an integrated structure, so that the stability is good, the installation is facilitated, the production efficiency is improved, and the partially eccentric structure effectively improves the turbulent effect; and on the other hand, the cutter head and the cup body are of a split structure to facilitate disassembly and maintenance, and in order to ensure the leak tightness of the cutter head and the cup body, preferably, a sealing ring is arranged between the cutter head and the cup body.

The additional aspects and advantages of the present disclosure will be obvious in the following description or learnt via practice of the present disclosure.

BRIEF DESCRIPTION OF THE DRAWINGS

The foregoing and/or additional aspects and advantages of the present disclosure will become apparent and understandable from the following description of the embodiments in conjunction with the accompanying drawings, wherein.

The corresponding relationship between reference signs in FIGS. 1-11 and component names is as follows:

1 food processor, 102 cup body, 104 cutter head, 106 cutter, 108 cup body base circle, 110 cup body contour line, 1102 outer contour line, 1104 inner contour line, 112 turbulent rib, 114 cup base, 116 cup lid, 118 feed port, 120 feed cover, 122 first group of blades, 124 second group of blades, 126 leaf blade, 128 cup lid sealing ring, 130 stirring cup sealing ring, 132 cutter head sealing ring, 134 coupler.

DETAILED DESCRIPTION OF THE EMBODIMENTS

In order to understand the foregoing purposes, features and advantages of the present disclosure more clearly, the present disclosure will be further described in detail below in combination with the accompanying drawings and specific embodiments. It should be noted that the embodiments of the present application and the features in the embodiments can be combined with one another without conflicts.

Many specific details are described below for sufficiently understanding the present disclosure. However, the present disclosure can also be implemented by using other embodiments different from those described herein. Therefore, the protection scope of the present disclosure is not limited to the specific embodiments disclosed below.

Referring to FIGS. 1-11, described below is a food processor according to some embodiments of the present disclosure.

Figure 3:
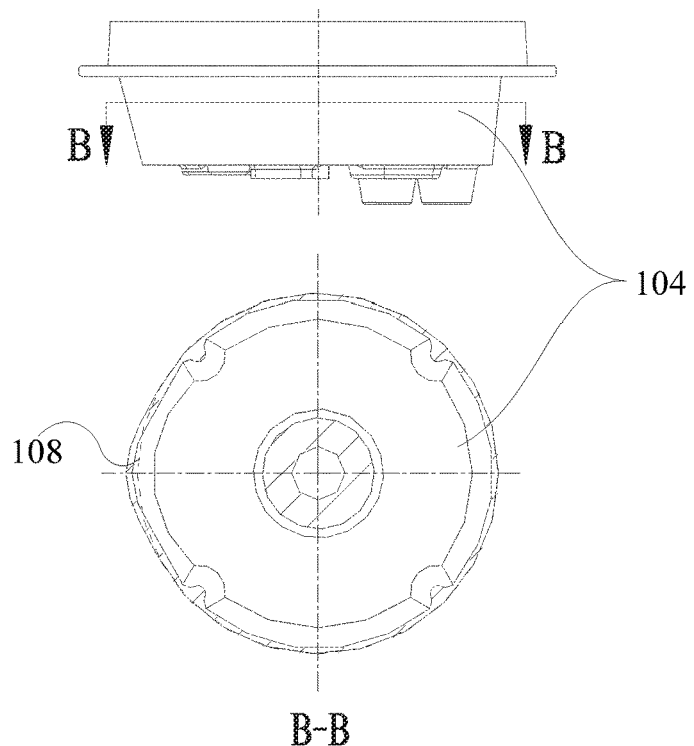
FIG. 3 is a schematic diagram of an eccentric structure of a cutter head in one embodiment of the present disclosure.
Figure 4:
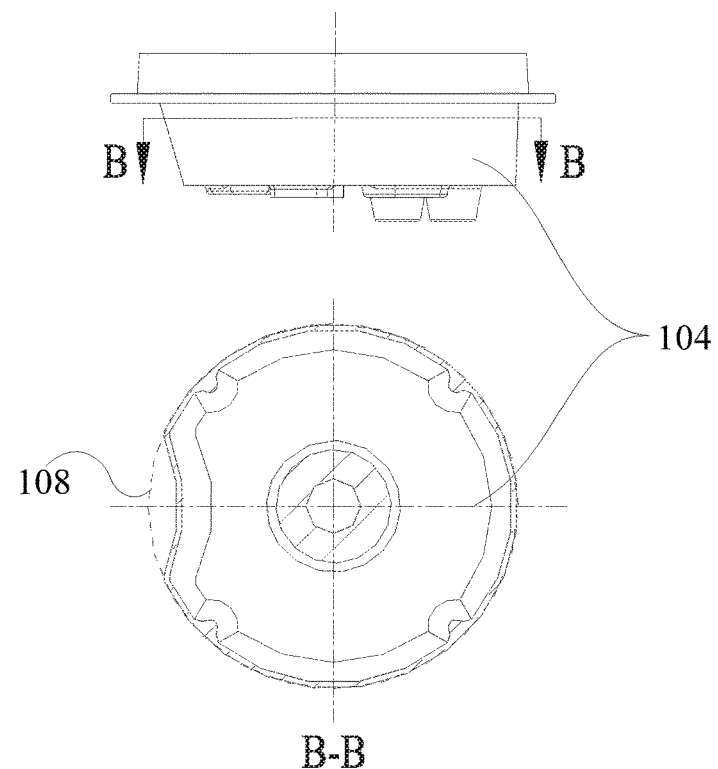
FIG. 4 is a schematic diagram of an eccentric structure of a cutter head in another embodiment of the present disclosure.

As shown in FIGS. 3 and 4, the present disclosure puts forward a food processor 1, comprising: a cutter head 104, on which a cutter 106 is arranged, wherein the intersecting line of the side wall of the cutter head 104 and the cross section of the cutter head 104 is a cutter head contour line, the maximum inscribed circle or the minimum circumscribed circle of the cutter head contour line is a cutter head base circle, and the central axis of the cutter head 104 penetrates the center of the cutter head base circle; and a cup body 102 located above the cutter head 104 and arranged on the cutter head 104, wherein the intersecting line of the cup wall of the cup body 102 and the cross section of the cup wall is a cup body contour line 110, the maximum inscribed circle or the minimum circumscribed circle of the cup body contour line 110 is a cup body base circle 108, and the central axis of the cup body 102 penetrates the center of the cup body base circle 108; wherein the distances between different points on the same cup body contour line 110 and the center of the cup body base circle 108 are equal; and the distances between different points on the same cutter head contour line and the center of the cutter head base circle are unequal.

Figure 1:
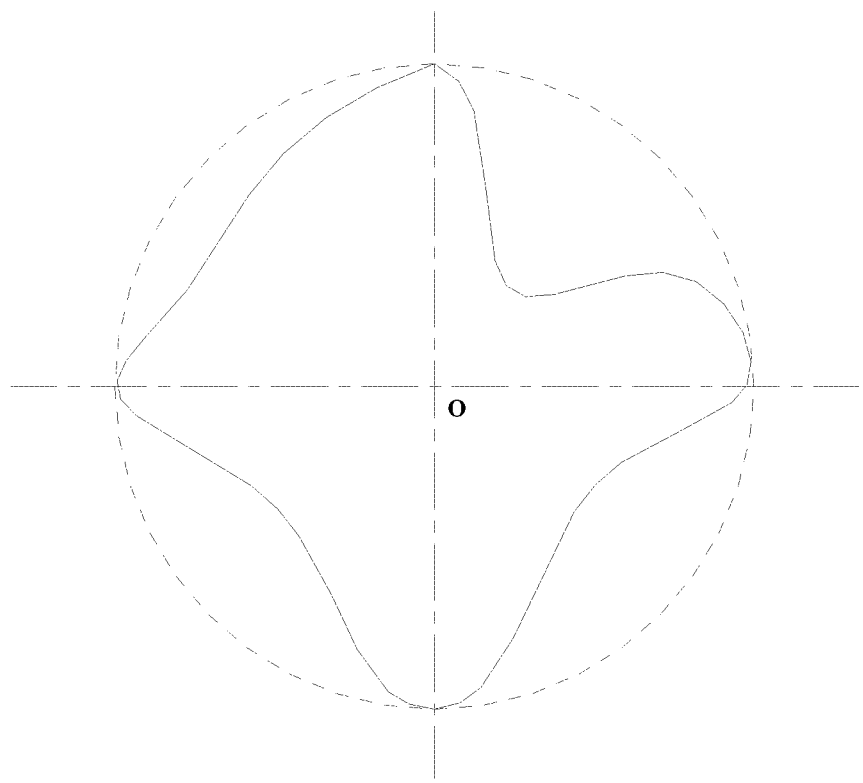
FIG. 1 is a schematic diagram of a minimum circumscribed circle.
Figure 2:
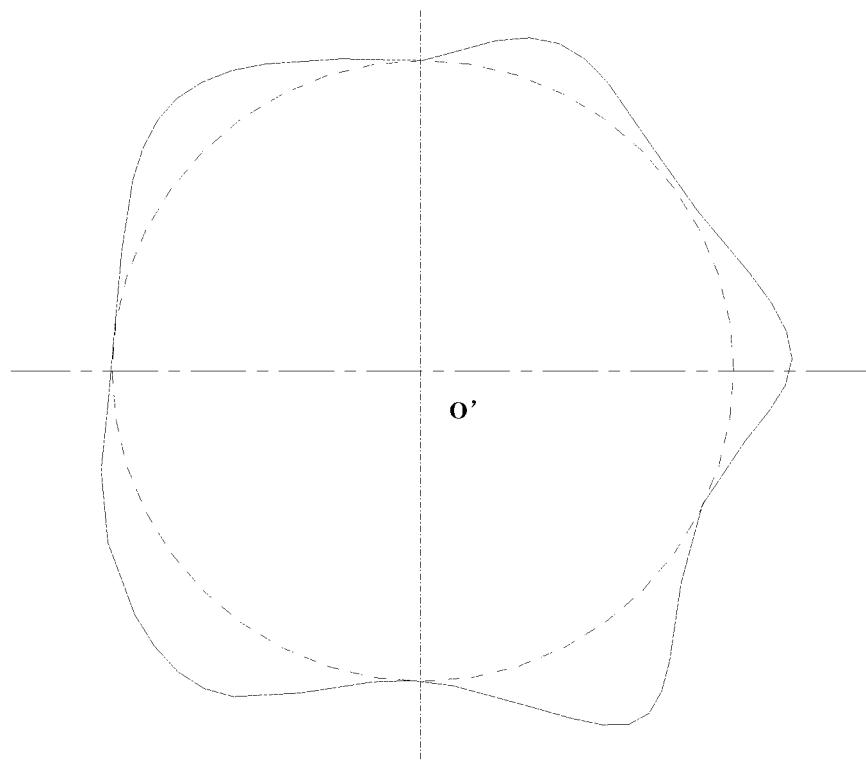
FIG. 2 is a schematic diagram of a maximum inscribed circle.

As shown in FIG. 1, the minimum circumscribed circle refers to a possible minimum circle circumscribed to the actually measured contour, and its center is 0; and as shown in FIG. 2, the maximum inscribed circle refers to a possible maximum circle inscribed to the actually measured contour, and its center is 0'. According to the food processor provided by the present disclosure, the maximum inscribed circles or the minimum circumscribed circles of the cutter head contour line and the cup body contour line are respectively a cutter head base circle of the cutter head contour line and a cup body base circle of the cup body contour line, and the axis of the cutter head and the axis of the cup body respectively penetrate the center of the cutter head base circle and the center of the cup body base circle. The distances between different points on the same cup body contour line and the center of the cup body base circle are equal, i.e., the cup body contour is not eccentric, and the distances between different points on the same cutter head contour line and the center of the cutter head base circle are unequal, i.e., the cutter head contour is of an eccentric structure. The food processor provided by the present disclosure has the cutter head contour of an eccentric structure for stirring food, so that the turbulent effect of stirring can be improved, the cutter is beneficial to crushing food, then the stirring performance is improved, the taste of the food is excellent and the user experience is improved. Further, in order to stir and crush food more sufficiently, the relative positions of the central axis of the cup body, the axis of the cutter head and the axis of the cutter can be adjusted to further improve the turbulent effect of stirring and improve the taste of the food.

In a specific embodiment, as shown in FIGS. 3 and 4, two eccentric structures of the cutter head contour respectively refer to that the cutter head contour protrudes outward and the cutter head contour sinks inward. Through the two eccentric structures, when food is stirred, the speed of stirring the food and the distance between the cutter and the inner wall of the cutter head are changed when the food passes through the protruding or sinking structure, and the turbulent effect is improved, so that the food is crushed more thoroughly.

Further, in the food processor 1 provided by the present disclosure, a heating device is arranged on the cutter head 104, and the heating device includes a heating plate, a coil panel, a heating coating and the like, wherein the heating plate is of a groove-type structure, the cutter 106 penetrates the heating device and is arranged in the cutter head, the cup body 102 is located above the heating device, and both the cup body 102 and the cutter head are provided with turbulent ribs 112. By combining the cutter head 104 of an eccentric structure with the turbulent ribs 112, the turbulent effect of stirring is improved, the cutter 106 is beneficial to crushing food, and then the stirring performance is improved, so that the taste of the food is excellent and the user experience is improved. Further, the cup body 102 of the food processor is provided with an upper opening and a lower opening, and the cross section of the cup body 102 is reduced from top to bottom, i.e., the whole cup body 102 has a certain taper, and the cross section area of the upper end is greater than that of the lower end, so that on the one hand, the cutter is beneficial to crushing food, and on the other hand, the cup body having a certain taper is beneficial to turbulence, the turbulent effect and crushing effect of food are further improved, and the taste of the food is promoted.

In one embodiment of the present disclosure, preferably, the central axis of the cutter head 104 is coincident with that of the cup body 102.

In this embodiment, the central axes of the cutter head 104 is coincident with that of the cup body 102, the contour of the cup body 102 is not eccentric, but the contour of the cutter head 104 is eccentric, so that the food processor 1 using the eccentric structure of the cutter head contour for stirring food can improve the whirl effect of stirring, the flowing speed of food is different, the cutter 106 is beneficial to crushing food, then the stirring performance is improved, the taste of the food is excellent, and the user experience is improved.

In one embodiment of the present disclosure, preferably, the central axis of the cutter head 104 and the axis of the cutter 106 are coincident with the central axis of the cup body 102.

In this embodiment, the central axis of the cutter head 104 and the axis of the cutter 106 are coincident with the central axis of the cup body 102, i.e., the cup body 102, the cutter head 104 and the cutter 106 are on the same central axis, the contour of the cup body 102 is not eccentric, but the contour of the cutter head 104 is eccentric, so that the food processor 1 using such an eccentric structure for stirring food can improve the whirl effect of stirring, the cutter 106 is beneficial to crushing food, then the stirring performance is improved, the taste of the food is excellent, and the user experience is improved.

In one embodiment of the present disclosure, preferably, the central axis of the cutter head 104 is coincident with that of the cup body 102, and has an eccentric distance L1 from the axis of the cutter 106.

In this embodiment, the central axis of the cutter head 104 is coincident with that of the cup body 102, and has an eccentric distance L1 from the axis of the cutter 106, i.e., the cutter 106 is eccentric. By using the structure that the cutter head contour is eccentric and the cutter is eccentric, the whirl effect of stirring is improved, the cutter 106 is beneficial to crushing food, and then the stirring performance is improved, so that the taste of the food is excellent and the user experience is improved.

In one embodiment of the present disclosure, preferably, the central axis of the cutter head 104 is not coincident with that of the cup body 102.

In this embodiment, the central axis of the cutter head 104 is not coincident with that of the cup body 102, i.e., the axes are relatively eccentric, meanwhile, the contour of the cup body 102 is not eccentric, but the contour of the cutter head 104 is eccentric, so that the food processor 1 using this eccentric structure for stirring food can improve the whirl effect of stirring, the cutter 106 is beneficial to crushing food, then the stirring performance is improved, the taste of the food is excellent and the user experience is improved.

In one embodiment of the present disclosure, preferably, the central axis of the cutter head 104 is coincident with the axis of the cutter 106, and has an eccentric distance L2 from the central axis of the cup body 102.

In this embodiment, the central axis of the cutter head 104 and the axis of the cutter 106 are coincident, and have an eccentric distance L2 from the central axis of the cup body 102, i.e., the cutter head 104 is coaxial with the cutter 106, the axis of the cup body 102 has an eccentric distance L2 from the axes of the cutter head 104 and the cutter 106, meanwhile, the cutter head contour is eccentric, but the cup body contour is not eccentric. Through the cup body 102 using such an eccentric structure for stirring food, the whirl effect of stirring can be improved, the cutter 106 is beneficial to crushing food, and then the stirring performance is improved, so that the taste of the food is excellent and the user experience is improved.

In one embodiment of the present disclosure, preferably, the central axis of the cup body 102 is coincident with the axis of the cutter 106, and has an eccentric distance L3 from the central axis of the cutter head 104.

In this embodiment, the central axis of the cup body 102 is coincident with the axis of the cutter 106, and has an eccentric distance L3 from the central axis of the cutter head 104, i.e., the cup body 102 is coaxial with the cutter 106 and has an eccentric distance L3 from the cutter head 104, meanwhile, the cutter head contour is also eccentric, but the cup body contour is not eccentric. By using this eccentric structure, the whirl effect of stirring is improved, the cutter 106 is beneficial to crushing food, and then the stirring performance is improved, so that the taste of the food is excellent and the user experience is improved.

In one embodiment of the present disclosure, preferably, the central axis of the cup body 102 has an eccentric distance L4 from the central axis of the cutter head 104; the central axis of the cutter head 104 has an eccentric distance L5 from the axis of the cutter 106; and the central axis of the cup body 102 has an eccentric distance L6 from the axis of the cutter 106.

In this embodiment, the central axis of the cup body 102, the central axis of the cutter head 104 and the axis of the cutter 106 all have eccentric distances, meanwhile, the cutter head contour is eccentric, but the cup body contour is not eccentric. By using such an eccentric structure, the whirl effect of stirring is further improved, the cutter 106 is beneficial to crushing food, and then the stirring performance is improved, so that the taste of the food is excellent and the user experience is improved. In the specific embodiment, when the central axis of the cup body, the central axis of the cutter and the central axis of the cutter head are nonlinear or not parallel, the distance between each central axis refers to the distance between each central axis and the intersecting point of any same cross section.

In one embodiment of the present disclosure, preferably, further comprising a contour eccentric distance, which is an absolute value obtained by subtracting the radius of the base circle from the distance between different points on the contour line and the center of the base circle, wherein the contour eccentric distance of the cutter head 104 is L7.

In this embodiment, the contour eccentric distance of the cutter head 104 is L7. Through the eccentric structure, the turbulent effect is improved, and then the stirring performance is promoted.

In one embodiment of the present disclosure, preferably, the eccentric distance L1, the eccentric distance L2, the eccentric distance L3, the eccentric distance L4, the eccentric distance L5 and the eccentric distance L6 are respectively more than or equal to 0 mm and less than or equal to 50 mm; and the contour eccentric distance L7 of the cutter head 104 is more than or equal to 0 mm and less than or equal to 100 mm.

In this embodiment, by setting reasonable eccentric distances, the optimal turbulent effect is realized, and the stirring performance is improved.

In one embodiment of the present disclosure, preferably, the cutter head 104 and the cup body 102 are of an integrated structure or a split structure.

In this embodiment, on the one hand, the cutter head 104 and the cup body 102 are of an integrated structure, so that the stability is good, the installation is facilitated, and the production efficiency is improved; and on the other hand, the cutter head 104 and the cup body 102 are of a split structure to facilitate disassembly and maintenance, and in order to ensure the leak tightness of the cutter head 104 and the cup body 102, preferably, a sealing ring is arranged between the cutter head 104 and the cup body 102.

In one embodiment of the present disclosure, preferably, the cross section of the cutter head 104 is dome-shaped.

In this embodiment, the cross section of the cutter head 104 is dome-shaped, and the eccentricity is formed via irregular curves, so that the turbulent effect of the cup body 102 is improved, the cutter 106 is beneficial to crushing food, and then the stirring performance is improved. Further, preferably, the dome shape is an ellipse, in the specific embodiment, the cross section of the cutter head 104 is an ellipse, the cup body 102 with such a structure is easy to be processed, meanwhile, the central axis of the cutter head 104, the central axis of the cutter 106 and the central axis of the cup body 102 are respectively distributed at two focuses of the ellipse to form eccentricity, so that the structure is simple, the operation is easy, the turbulent effect of the cup body 102 is further improved, the cutter 106 is beneficial to crushing food, and then the stirring performance is improved. In the specific embodiment, on the one hand, the ellipse has two focuses F1 and F2, the central axis of the cutter head 104 and the central axis of the cutter 106 may be coaxially distributed at one of the two focuses F1 and F2 of the ellipse, and the central axis of the cup body 102 may be distributed at the other one of the two focuses F1 and F2 of the ellipse; on the other hand, the central axis of the cutter head 104 and the central axis of the cutter 106 are not coaxial but respectively located at one of the two focuses F1 and F2 of the ellipse, and the central axis of the cup body 102 is coaxial with one of the central axis of the cutter head 104 and the central axis of the cutter 106; and on a further hand, the central axis of the cutter head 104 and the central axis of the cutter 106 are not coaxial but respectively located at one of the two focuses F1 and F2 of the ellipse, the central axis of the cup body 102 is not coaxial with both the central axis of the cutter head 104 and the central axis of the cutter 106, and the central axis of the cup body 102 is located on a point in the ellipse except the focuses F1 and F2. Listed above are only part of the embodiments, the protection scope of the present application is not limited thereto, and the distribution positions of the central axis of the cup body 102, the central axis of the cutter head 104 and the central axis of the cutter 106 are implemented according to specific circumstances, and are subject to achieving the optimal effect.

In one embodiment of the present disclosure, preferably, as shown in FIG. 2, the cup wall comprises an outer wall and an inner wall of the cup body 102; and the contour line of the cup body 102 is an intersecting line of the outer wall of the cup body 102 and the cross section of the outer wall of the cup body 102, or the contour line of the cup body 102 is an intersecting line of the inner wall of the cup body 102 and the cross section of the inner wall of the cup body 102.

In this embodiment, the contour line of the cup body 102 may be an intersecting line of the outer wall of the cup body 102 and the cross section of the cup wall, i.e., a cup body inner contour line 1104, or an intersecting line of the inner wall of the cup body 102 and the cross section of the cup wall, i.e., a cup body outer contour line 1102. The contour line may be obtained by multiple ways, and the distances between different points on the same contour line and the center of the base circle of the cutter head 104 are unequal, so that an eccentric structure is formed, then the whirl effect is improved, and the stirring performance is promoted.

In one embodiment of the present disclosure, preferably, the cutter 106 comprises at least two groups of blades, each of which comprises at least two leaf blades 126, wherein the leaf blades 126 of one group of blades extend downward obliquely, and the leaf blades 126 of the other group of blades extend upward obliquely; or the leaf blades 126 of one group of blades extend horizontally, and the leaf blades 126 of the other group of blades extend upward or downward obliquely.

In this embodiment, multiple groups of blades are provided, and the extending angle of each group of blades is different, so that the turbulent effect of the cup body is further improved, the contact area of the cutter 106 and food is increased to realize multiple times of crushing on food, the food is crushed more thoroughly, the taste of the food is promoted, and the satisfaction of a user is improved.

In one embodiment of the present disclosure, preferably, the cutter 106 comprises two groups of blades, which are respectively a first group of blades 122 and a second group of blades 124, each of which is composed of two leaf blades 126; the leaf blade 126 of the first group of blades 122 comprise an oblique part and a horizontal part, the oblique part is close to the central axis of the cutter head 104, and the horizontal part is away from the central axis of the cutter head 104; wherein the leaf blades 126 of the first group of blades 122 extend downward obliquely and are arranged below the second group of blades 124, and the leaf blades 126 of the second group of blades 124 extend upward obliquely.

In this embodiment, two groups of blades are provided, wherein the first group of blades 122 is arranged above the second group of blades 124, the leaf blades 126 of the first group of blades 122 extend downward, while the leaf blades 126 of the second group of blades 124 extend upward, i.e., the extending directions are opposite; through the two groups of blades setting upper and lower, the contact area of the cutter 106 and food is increased sufficiently, and the crushing efficiency is improved; and the extending directions of the leaf blades 126 are opposite, so that the turbulent effect and the crushing effect on different heights are further improved, the overall food crushing efficiency is improved, the crushing effect is also improved, and the taste of the food and the user experience are promoted.

In one embodiment of the present disclosure, preferably, the first group of blades 122 and the second group of blades 124 are of an integrated structure.

In this embodiment, the two groups of blades are of an integrated structure, so that the overall strength of the cutter 106 is improved, the service reliability of the cutter 106 is guaranteed, and the service life of the cutter 106 is prolonged; and the integrated cutter 106 facilitates maintenance and installation, and improves the production efficiency.

In one embodiment of the present disclosure, preferably, turbulent ribs 112 are arranged in the cup body 102, a cup lid 116 is arranged on the cup body 102, the cup lid 116 is provided with a feed port 118, and a feed cover 120 is arranged on the feed port 118.

In this embodiment, turbulent ribs 112 are arranged in the cup body 102, thus further improving the turbulent effect and the crushing effect; a cup lid 116 is arranged on the cup body 102, thus preventing splashing in the cup body 102 in the food crushing process which may make the surrounding environment messy; the cup lid 116 is further provided with a feed port 118, thus facilitating feeding, avoiding frequently opening the cup lid 116 and reducing the operation steps; and in order to prevent foreign matters from entering the cup body 102, a feed cover 120 is arranged at the feed port 118, and the feed port 118 is closed by the feed cover 120 after feeding, thus ensuring the using sanitation.

In one embodiment of the present disclosure, preferably, a cup base 114 on which the cup body 102 is arranged is further included, wherein the cup body 102 is connected to the cup base 114 via threads or clamping.

In this embodiment, the cup body 102 is arranged on the cup base 114, and the cup body 102 is connected to the cup base 114 via threads or clamping, so that the structure is simple, assembly and disassembly are facilitated, the production efficiency is improved, and the production cost is reduced.

In one embodiment of the present disclosure, preferably, a sealing ring is arranged between the cutter head 104 and the cup body 102, and the cup body 102 is connected to the cup base 114 via threads to press and fix the cutter head 104 at the bottom of the cup body 102.

In this embodiment, a sealing ring is arranged between the cutter head 104 and the cup body 102, thus ensuring the sealing effect between the cup body 102 and the cutter head 104; and furthermore, the cup body 102 is connected to the cup base 114 via threads to press the cutter head 104 at the bottom of the cup body 102, thus facilitating fixation of the cutter head 104 and ensuring the using safety.

As shown in FIGS. 5-9, according to the embodiment in another aspect of the present disclosure, provided is a food processor 1, comprising: a cutter head 104, on which a cutter 106 is arranged, wherein the intersecting line of the side wall of the cutter head 104 and the cross section of the cutter head 104 is a cutter head contour line, the maximum inscribed circle or the minimum circumscribed circle of the cutter head contour line is a cutter head base circle, and the central axis of the cutter head 104 penetrates the center of the cutter head base circle; and a cup body 102 located above the cutter head 104 and arranged on the cutter head 104, wherein the intersecting line of the cup wall of the cup body 102 and the cross section of the cup wall is a cup body contour line 110, the maximum inscribed circle or the minimum circumscribed circle of the cup body contour line 110 is a cup body base circle 108, and the central axis of the cup body 102 penetrates the center of the cup body base circle 108; wherein the central axis of the cutter head 104 is coincident or not coincident with that of the cup body 102.

Figure 5:
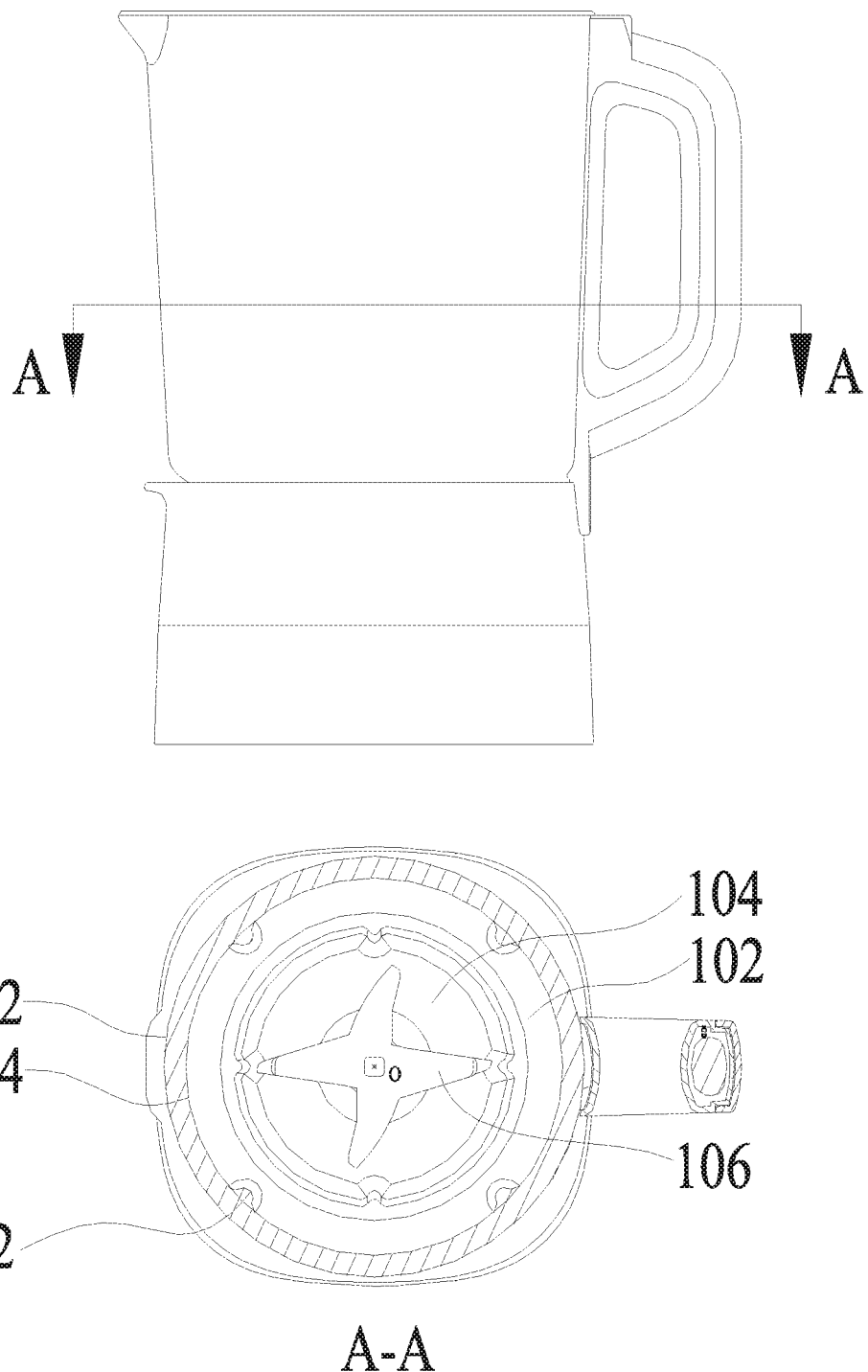
FIG. 5 is a structural schematic diagram of a food processor in one embodiment of the present disclosure.

In the food processor 1 provided by the present disclosure, as shown in FIG. 1, the minimum circumscribed circle refers to a possible minimum circle circumscribed to the actually measured contour, and its center is O; and as shown in FIG. 2, the maximum inscribed circle refers to a possible maximum circle inscribed to the actually measured contour, and its center is O'. According to the food processor provided by the present disclosure, the maximum inscribed circles or the minimum circumscribed circles of the cutter head contour line and the cup body contour line are respectively a cutter head base circle of the cutter head contour line and a cup body base circle of the cup body contour line, and the axis of the cutter head and the axis of the cup body respectively penetrate the center of the cutter head base circle and the center of the cup body base circle. As shown in FIG. 5, on the one hand, the central axis of the cutter head 104 is coincident with that of the cup body 102, i.e., the central axes of the cutter head 104 and the cup body 102 are coincident, and may be coincident with the axis of the cutter 106 or have an eccentric distance; and on the other hand, the central axis of the cutter head 104 is not coincident with that of the cup body 102, i.e., the cutter head 104 is coaxial with the cutter 106 and has an eccentric distance from the cup body 102, the cup body 102 is coaxial with the cutter 106 and has an eccentric distance from the cutter head 104, or every two of the central axis of the cutter head 104, the central axis of the cup body 102 and the axis of the cutter 106 have an eccentric distance. The food processor 1 for stirring food by using an eccentric technology has the advantages that the whirl effect of stirring can be improved, the cutter 106 is beneficial to crushing food, then the stirring performance is improved, the taste of the food is excellent and the user experience is improved.

In one embodiment of the present disclosure, preferably, the central axis of the cutter head 104 and the axis of the cutter 106 are coincident with the central axis of the cup body 102.

In this embodiment, as shown in FIG. 5, the central axis of the cup body 102 penetrating the center OC of the cup body base circle, the axis of the cutter 106 penetrating the cutter axis OK and the central axis of the cutter head 104 penetrating the center Op of the cutter head base circle are coincident, i.e., the cup body 102, the cutter head 104 and the cutter 106 are on the same central axis, so that the food processor 1 using such an eccentric structure for stirring food can improve the whirl effect of stirring, the cutter 106 is beneficial to crushing food, then the stirring performance is improved, the taste of the food is excellent, and the user experience is improved.

In one embodiment of the present disclosure, preferably, the central axis of the cutter head 104 is coincident with that of the cup body 102, and has an eccentric distance L1 from the axis of the cutter 106.

Figure 6:
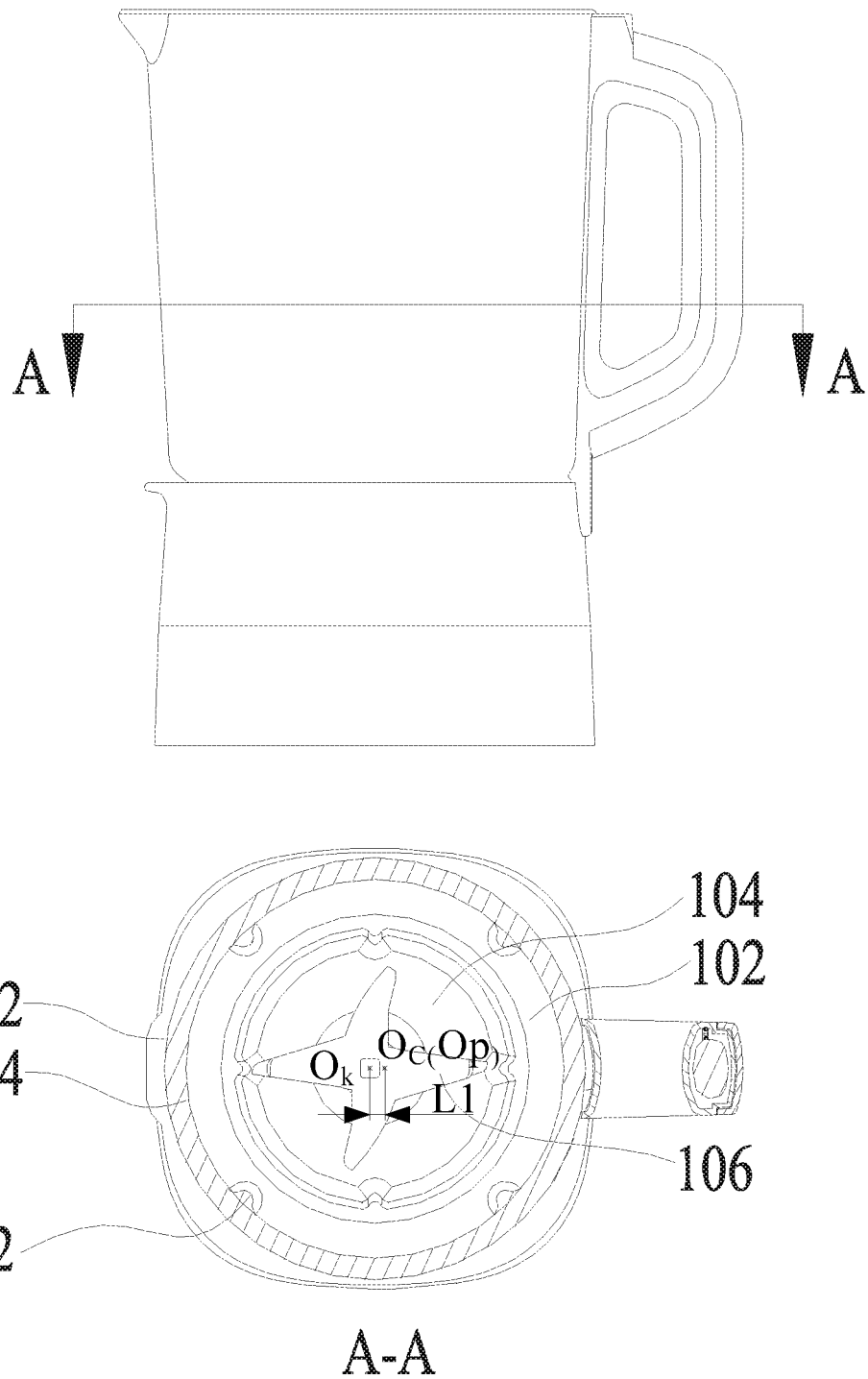
FIG. 6 is a structural schematic diagram of a food processor in another embodiment of the present disclosure.

In this embodiment, as shown in FIG. 6, the central axis of the cutter head 104 penetrating the center Op of the cutter head base circle is coincident with that of the cup body 102 penetrating the center OC of the cup body base circle, and has an eccentric distance L1 from the axis of the cutter 106 penetrating the cutter axis OK, i.e., the cutter 106 is eccentric. By using the structure that the cutter 106 is relatively eccentric, the whirl effect of stirring is improved, the cutter 106 is beneficial to crushing food, and then the stirring performance is improved, so that the taste of the food is excellent and the user experience is improved.

In one embodiment of the present disclosure, preferably, the central axis of the cutter head 104 and the axis of the cutter 106 are coincident, and have an eccentric distance L2 from the central axis of the cup body 102.

Figure 7:
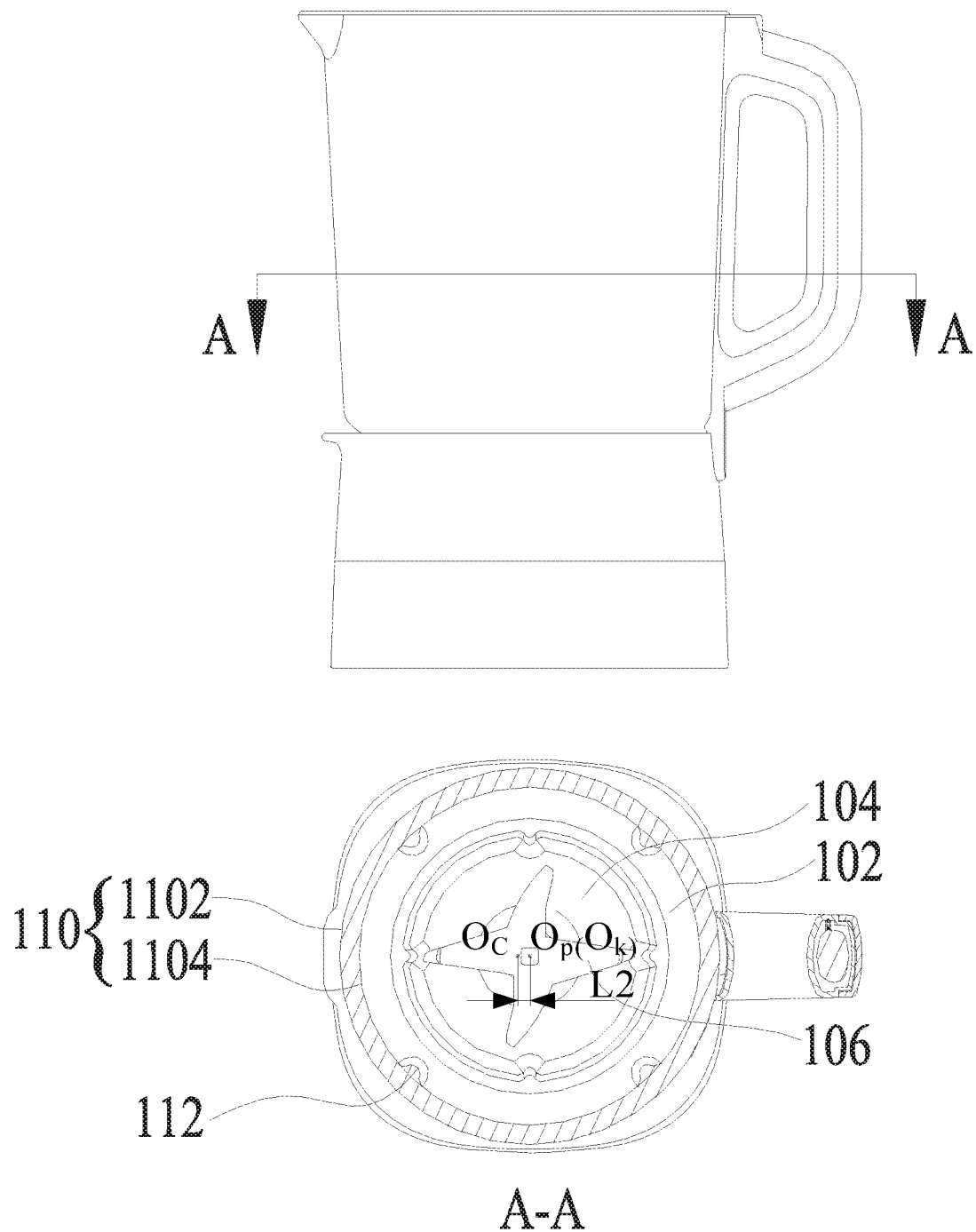
FIG. 7 is a structural schematic diagram of a food processor in a further embodiment of the present disclosure.

In this embodiment, as shown in FIG. 7, the central axis of the cutter head 104 penetrating the center Op of the cutter head base circle and the axis of the cutter 106 penetrating the cutter axis OK are coincident, and have an eccentric distance L2 from the central axis of the cup body 102 penetrating the center OC of the cup body base circle, i.e., the cutter head 104 is coaxial with the cutter 106, and the axis of the cup body 102 has an eccentric distance L2 from the axes of the cutter head 104 and the cutter 106. By using the cup body 102 with such an eccentric structure for stirring food, the whirl effect of stirring can be improved, the cutter 106 is beneficial to crushing food, and then the stirring performance is improved, so that the taste of the food is excellent and the user experience is improved.

In one embodiment of the present disclosure, preferably, the central axis of the cup body 102 is coincident with the axis of the cutter 106, and has an eccentric distance L3 from the central axis of the cutter head 104.

Figure 8:
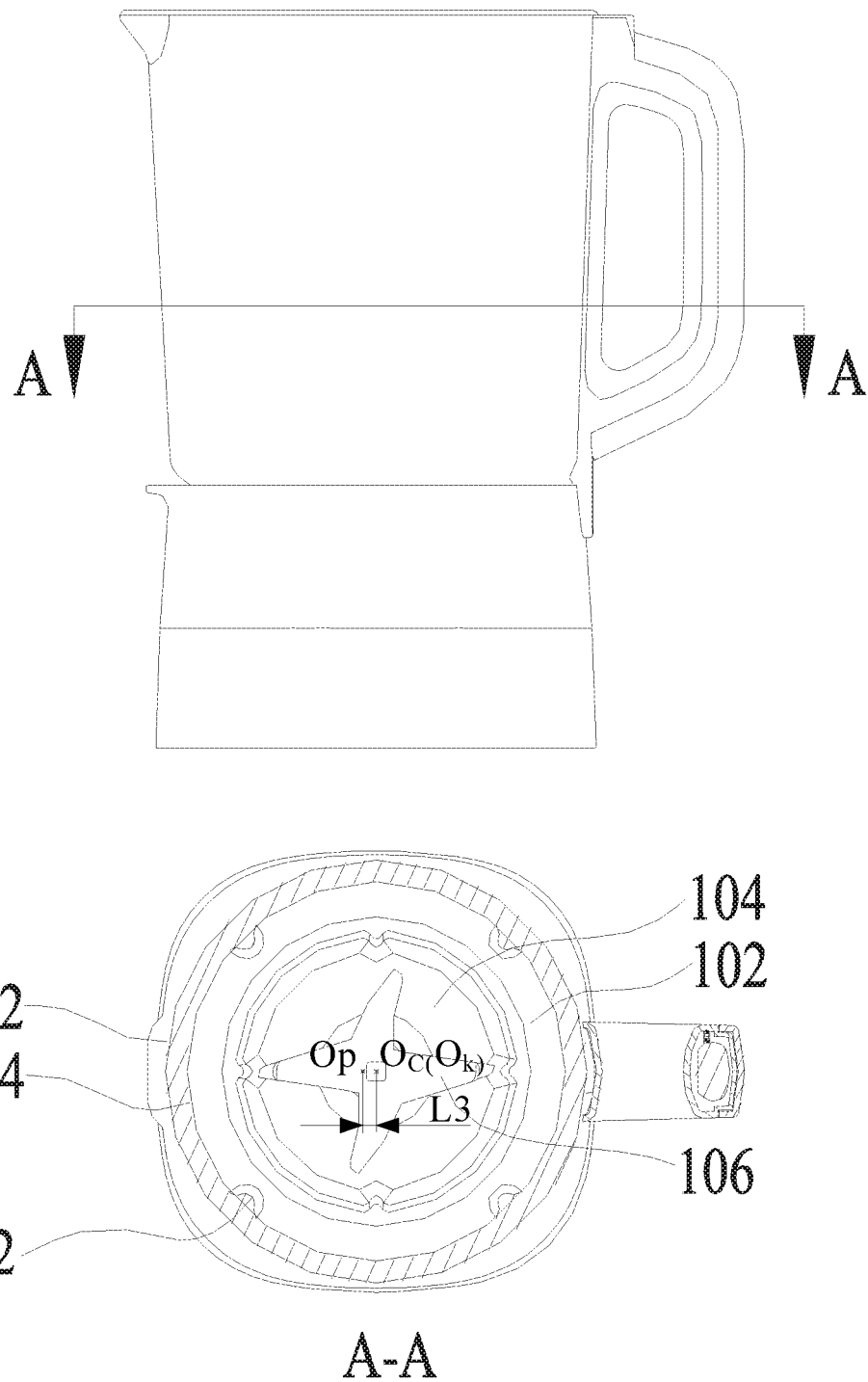
FIG. 8 is a structural schematic diagram of a food processor in a further embodiment of the present disclosure.

In this embodiment, as shown in FIG. 8, the central axis of the cup body 102 penetrating the center OC of the cup body base circle is coincident with the axis of the cutter 106 penetrating the cutter axis OK, and has an eccentric distance L3 from the central axis of the cutter head 104 penetrating the center OP of the cutter head base circle, i.e., the cup body 102 is coaxial with the cutter 106 and has an eccentric distance L3 from the cutter head 104. By using such an eccentric structure, the whirl effect of stirring is improved, the cutter 106 is beneficial to crushing food, and then the stirring performance is improved, so that the taste of the food is excellent and the user experience is improved.

In one embodiment of the present disclosure, preferably, the central axis of the cup body 102 and the central axis of the cutter head 104 have an eccentric distance L4; the central axis of the cutter head 104 and the axis of the cutter 106 have an eccentric distance L5; and the central axis of the cup body 102 and the axis of the cutter 106 have an eccentric distance L6.

Figure 9:
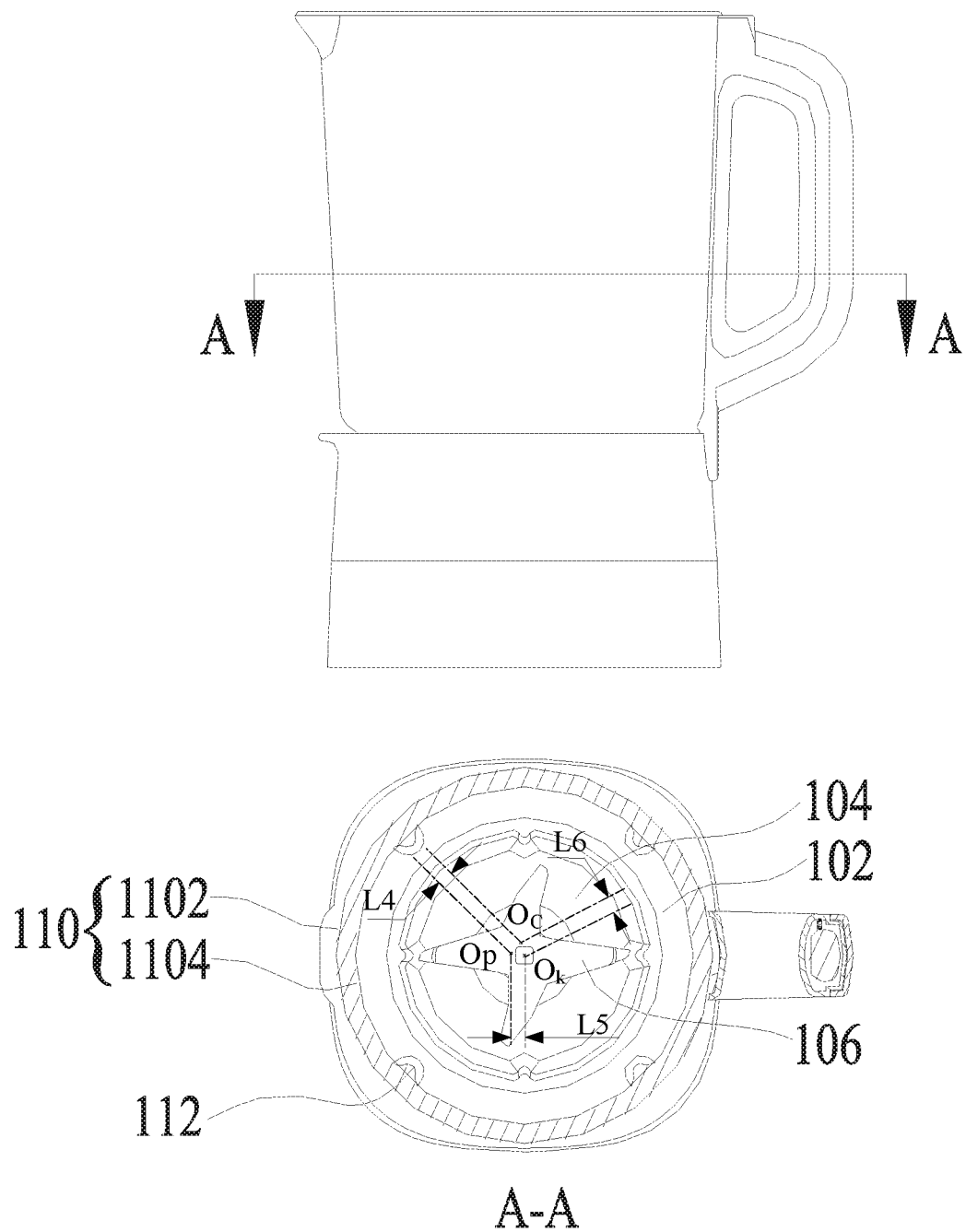
FIG. 9 is a structural schematic diagram of a food processor in a further embodiment of the present disclosure.

In this embodiment, as shown in FIG. 9, the central axis of the cup body 102 penetrating the center OC of the cup body base circle, the axis of the cutter 106 penetrating the cutter axis OK and the central axis of the cutter head 104 penetrating the center OP of the cutter head base circle all have eccentric distances. By using such an eccentric structure, the whirl effect of stirring is further improved, the cutter 106 is beneficial to crushing food, and then the stirring performance is improved, so that the taste of the food is excellent and the user experience is improved. In the specific embodiment, when the central axis of the cup body, the central axis of the cutter and the central axis of the cutter head are nonlinear or not parallel, the distance of each central axis refers to the distance between each central axis and the intersecting point of any same cross section.

In one embodiment of the present disclosure, preferably, the eccentric distance L1, the eccentric distance L2, the eccentric distance L3, the eccentric distance L4, the eccentric distance L5 and the eccentric distance L6 are respectively more than or equal to 0 mm and less than or equal to 50 mm.

In one embodiment of the present disclosure, preferably, the distances between different points on the same cup body contour line 110 and the center of the cup body base circle 108 are equal; and the distances between different points on the same cutter head contour line 110 and the center of the cutter head base circle 108 are equal.

In this embodiment, the distances between different points on the same cup body contour line 110 and the center of the cup body base circle 108 are equal, i.e., the cup body contour line 110 is not eccentric, and the distances between different points on the same cutter head contour line and the center of the cutter head base circle are equal, i.e., the cutter head contour line is not eccentric. Meanwhile, on the basis that both the cup body contour and the cutter head contour are not eccentric, on the one hand, the central axis of the cutter head is coincident with that of the cup body; and on the other hand, the central axis of the cutter head is not coincident with that of the cup body, i.e., the central axis of the cutter head and the central axis of the cup body are relatively eccentric. Through the food processor 1 using the eccentric technology for stirring food, the whirl effect of stirring can be improved, the cutter 106 is beneficial to crushing food, and then the stirring performance is improved, so that the taste of the food is excellent and the user experience is improved.

In one embodiment of the present disclosure, preferably, a contour eccentric distance is further included, which is an absolute value of subtracting the radius of the base circle from the distance between different points on the contour line and the center of the base circle, wherein the contour eccentric distance of the cutter head is L7.

In this embodiment, the contour eccentric distance of the cutter head is L7, and the contour of the cup body 102 is not eccentric. Through the eccentric structure, the turbulent effect is improved, and then the stirring performance is promoted.

In one embodiment of the present disclosure, preferably, the contour eccentric distance of the cutter head L7 is more than or equal to 0 mm and less than or equal to 100 mm.

In this embodiment, by reasonably setting the value of the contour eccentric distance of the cutter head, the optimal turbulent effect can be realized, and then the crushing effect is improved.

In one embodiment of the present disclosure, preferably, the cross section of the cutter head 104 is dome-shaped.

In this embodiment, the cross section of the cutter head 104 is dome-shaped, and the eccentricity is formed by irregular curves, so that the turbulent effect of the cup body 102 is improved, the cutter 106 is beneficial to crushing food, and then the stirring performance is improved. Further, preferably, the dome shape is an ellipse, in the specific embodiment, the cross section of the cutter head 104 is an ellipse, the cup body 102 with such a structure is easy to be processed, meanwhile, the central axis of the cutter head 104, the central axis of the cutter 106 and the central axis of the cup body 102 are respectively distributed at two focuses of the ellipse to form eccentricity, so that the structure is simple, the operation is easy, the turbulent effect of the cup body 102 is further improved, the cutter 106 is beneficial to crushing food, and then the stirring performance is improved. In the specific embodiment, on the one hand, the ellipse has two focuses F1 and F2, the central axis of the cutter head 104 and the central axis of the cutter 106 may be coaxially distributed at one of the two focuses F1 and F2 of the ellipse, and the central axis of the cup body 102 may be distributed at the other one of the two focuses F1 and F2 of the ellipse; on the other hand, the central axis of the cutter head 104 and the central axis of the cutter 106 are not coaxial but respectively located at one of the two focuses F1 and F2 of the ellipse, and the central axis of the cup body 102 is coaxial with one of the central axis of the cutter head 104 and the central axis of the cutter 106; and on a further hand, the central axis of the cutter head 104 and the central axis of the cutter 106 are not coaxial but respectively located at one of the two focuses F1 and F2 of the ellipse, the central axis of the cup body 102 is not coaxial with both the central axis of the cutter head 104 and the central axis of the cutter 106, and the central axis of the cup body 102 is located on a point in the ellipse except the focuses F1 and F2. Listed above are only part of the embodiments, the protection scope of the present application is not limited thereto, and the distribution positions of the central axis of the cup body 102, the central axis of the cutter head 104 and the central axis of the cutter 106 are implemented according to specific circumstances, and are subject to achieving the optimal effect.

In one embodiment of the present disclosure, preferably, the cutter head 104 and the cup body 102 are of an integrated structure or a split structure.

In this embodiment, on the one hand, the cutter head 104 and the cup body 102 are of an integrated structure, so that the stability is good, the installation is facilitated, and the production efficiency is improved; and on the other hand, the cutter head 104 and the cup body 102 are of a split structure to facilitate disassembly and maintenance, and in order to ensure the leak tightness of the cutter head 104 and the cup body 102, preferably, a sealing ring is arranged between the cutter head 104 and the cup body 102.

In one embodiment of the present disclosure, preferably, the food processor includes a stirrer, a wall crusher or a juicer.

In this embodiment, the food processor with an eccentric stirring function includes a stirrer, a wall crusher, a juicer, a soybean milk maker or the like. Through eccentric setting, the whirl effect is improved, and the stirring performance is promoted, so that the taste of the food is excellent and the user experience is improved.

Figure 10:
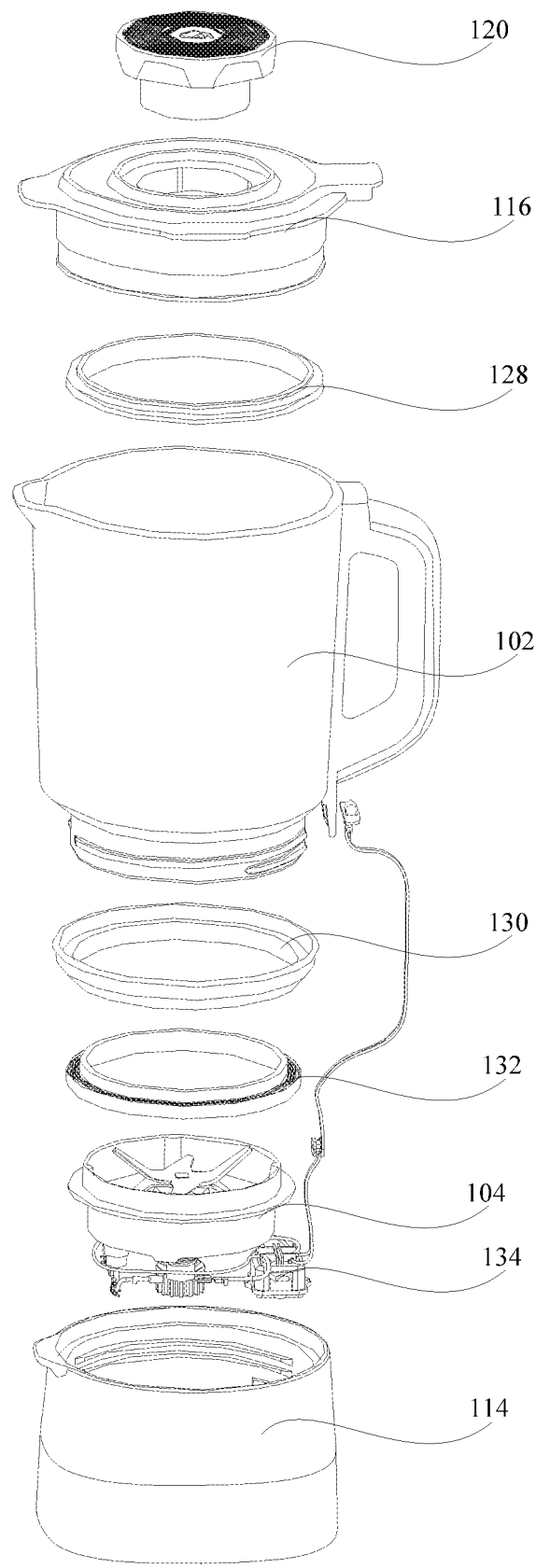
FIG. 10 is an exploded structural schematic diagram of a food processor in one embodiment of the present disclosure.
Figure 11:
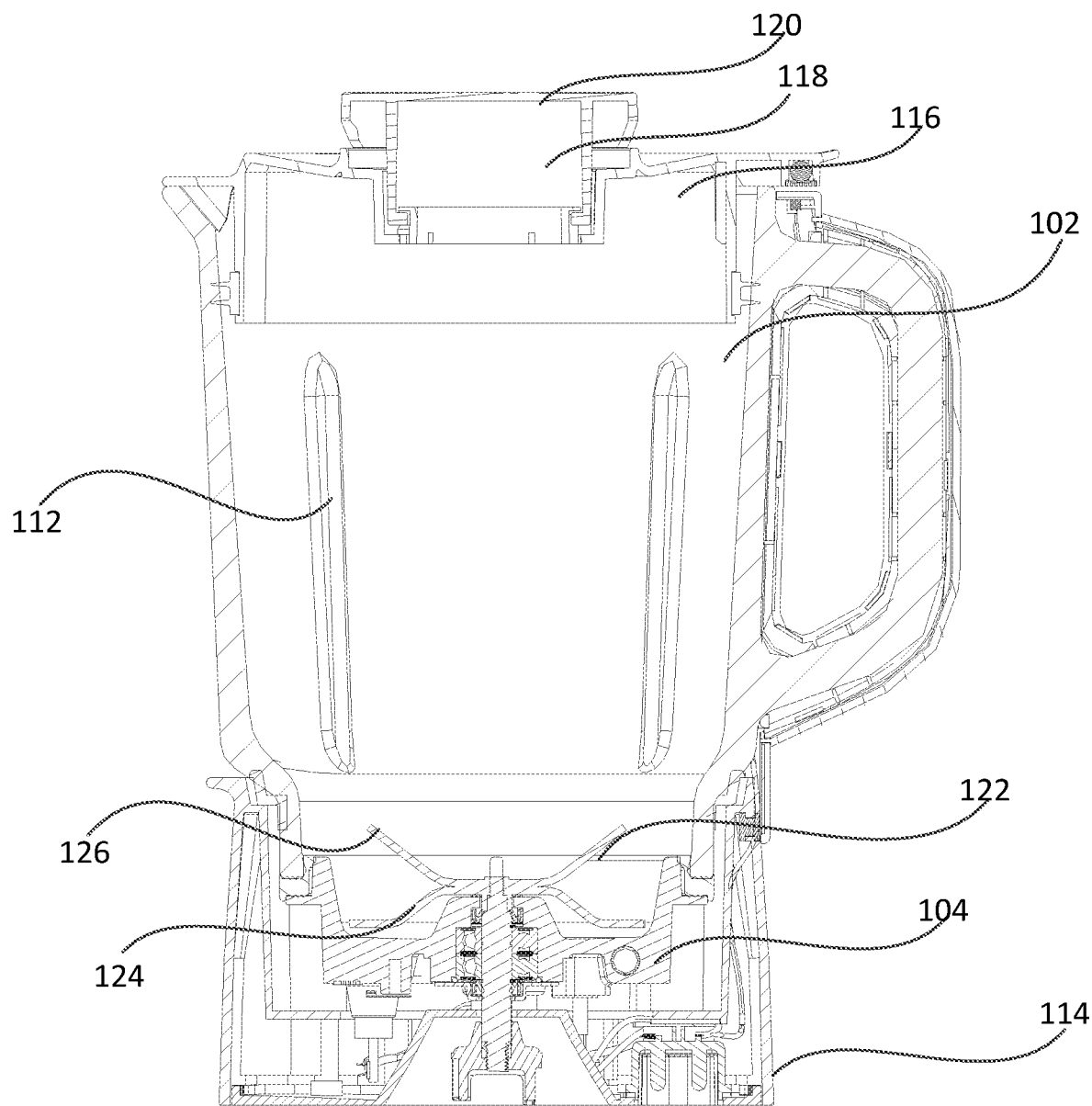
FIG. 11 is a structural schematic diagram of the food processor in the embodiment shown by FIG. 10 after assembly.

As shown in FIGS. 10 and 11, the stirrer in the specific embodiment of the food processor provided by the present disclosure mainly includes a cup body assembly, a stirring cutter assembly 106, a cutter head 104 and a stirring cup base 114, wherein the stirring cutter assembly is arranged on the cutter head 104, the cup body assembly is connected to the cutter head 104, and a coupler 134 is arranged on the stirring cup base 114. The cup body assembly includes a stirring cup 102 and a cup lid 116 on the stirring cup, the cup lid 116 is provided with a feed port 118, a feed cover 120 is arranged on the feed port 118, and a cup lid sealing ring 128 is arranged between the cup lid 116 and the stirring cup 102; and when the stirring cup 102 and the cutter head 104 are of a split structure, a stirring cup sealing ring 130 and a cutter head sealing ring 132 are arranged between the stirring cup 102 and the cutter head 104. By using the structure that the cutter head is eccentric or the axes of the cup body, the cutter head and the cutter are relatively eccentric, the turbulent effect of food can be effectively improved, the taste of the food is promoted, and the satisfaction of a user is improved.

In the present disclosure, the term "multiple" refers to two or more, unless otherwise specified. The terms "mounted", "connected", "fixed" and the like should be understood generally, e.g., "connected" may be fixedly connected, detachably connected or integrally connected; and "connected" may be directly connected or indirectly connected via a medium. For those of ordinary skill in the art, the specific meanings of the terms in the present disclosure can be understood according to specific circumstances.

In the description of this specification, the terms "one embodiment", "some embodiments", "specific embodiment" and the like imply that the specific features, structures, materials or characteristics described in combination with the embodiment or example are included in at least one embodiment or example of the present disclosure. In this specification, the schematic expressions of the terms do not necessarily refer to the same embodiments or examples. Furthermore, the described specific features, structures, materials or characteristics may be combined in any one or more embodiments or examples by appropriate ways.

Described above are merely preferred embodiments of the present disclosure, and the present disclosure is not limited thereto. Various modifications and changes may be made to the present disclosure for those skilled in the art. Any modification, equivalent substitution, improvement and the like made within the spirit and principle of the present disclosure shall fall into the protection scope of the present disclosure.

What is claimed is:

1. A food processor, comprising:
a cup base;
a detachable cutter head, on which a cutter is arranged, wherein an intersecting line of a side wall of the detachable cutter head and a cross section of the detachable cutter head is a cutter head contour line, a maximum inscribed circle or a minimum circumscribed circle of the cutter head contour line is a cutter head base circle, and a central axis of the detachable cutter head penetrates the center of the cutter head base circle; and
a cup body located above the detachable cutter head and arranged on the detachable cutter head, the cup body having a larger diameter at a widest portion of the cup body than a diameter of the detachable cutter head at a widest portion of the detachable cutter head, and detachable from the detachable cutter head, wherein an intersecting line of a cup wall of the cup body and a cross section of the cup wall is a cup body contour line, a maximum inscribed circle or a minimum circumscribed circle of the cup body contour line is a cup body base circle, and a central axis of the cup body penetrates the center of the cup body base circle;
wherein the detachable cutter head is detachable from the cup base and the cup body, the distances between different points on the same cup body contour line and the center of the cup body base circle are equal; and
the distances between two different points on the same cutter head contour line and the center of the cutter head base circle are unequal, wherein
the central axis of the cup body has an eccentric distance L4 from the central axis of the cutter head;
the central axis of the cutter head has an eccentric distance L5 from the axis of the cutter; and
the central axis of the cup body has an eccentric distance L6 from the axis of the cutter.

2. The food processor of claim 1, wherein the cutter head and the cup body are of a split structure.

3. The food processor of claim 1, wherein
the cup wall comprises an outer wall and an inner wall of the cup body; and
the contour line of the cup body is an intersecting line of the outer wall of the cup body and the cross section of the outer wall of the cup body, or the contour line of the cup body is an intersecting line of the inner wall of the cup body and the cross section of the inner wall of the cup body.

4. The food processor of claim 1, wherein
the cutter comprises at least two groups of blades, each of which comprises at least two blades;
wherein leaf blades of one group of blades extend downward obliquely, and leaf blades of the other group of blades extend upward obliquely; or
the leaf blades of one group of blades extend horizontally, and the leaf blades of the other group of blades extend upward or downward obliquely.

5. The food processor of claim 4, wherein
the cutter comprises two groups of blades, which are respectively a first group of blades and a second group of blades, each of which is composed of two leaf blades;

a leaf blade of the first group of blades comprises an oblique part and a horizontal part, the oblique part is close to the central axis of the cutter head, and the horizontal part is away from the central axis of the cutter head;

wherein the leaf blades of the first group of blades extend downward obliquely and are arranged below the second group of blades, and the leaf blades of the second group of blades extend upward obliquely.

6. A food processor, comprising:

a cup base;

a cutter head, on which a cutter is arranged, wherein an intersecting line of a side wall of the cutter head and a cross section of the cutter head is a cutter head contour line, the maximum inscribed circle or the minimum circumscribed circle of the cutter head contour line is a cutter head base circle, and the central axis of the cutter head penetrates the center of the cutter head base circle; and a cup body located above the cutter head and arranged on the cutter head, the cup body having a larger diameter at a widest portion of the cup body than a diameter of the cutter head at a widest portion of the cutter head, and detachable from the cutter head, wherein the intersecting line of a cup wall of the cup body and a cross section of the cup wall is a cup body contour line, the maximum inscribed circle or the minimum circumscribed circle of the cup body contour line is a cup body base circle, and the central axis of the cup body penetrates the center of the cup body base circle;

wherein the detachable cutter head is detachable from the cup base and the cup body, the central axis of the cup body has an eccentric distance L4 from the central axis of the cutter head;

the central axis of the cutter head has an eccentric distance L5 from the axis of the cutter; and the central axis of the cup body has an eccentric distance L6 from the axis of the cutter.

7. The food processor of claim 6, wherein the cross section of the cutter head is an ellipse.

* * * * *